United States Patent
Wang et al.

(10) Patent No.: US 7,546,038 B2
(45) Date of Patent: Jun. 9, 2009

(54) METHOD FOR WIRELESS OPTICAL TRANSMISSION OF DATA AND WIRELESS OPTICAL DATA TRANSMISSION SYSTEM

(75) Inventors: Zhaocheng Wang, Stuttgart (DE); Kao-Cheng Huang, Gillingham (GB); Masahiro Uno, Fellbach (DE)

(73) Assignee: Sony Deutschland GmbH, Cologne (DE)

( * ) Notice: Subject to any disclaimer, the term of this patent is extended or adjusted under 35 U.S.C. 154(b) by 487 days.

(21) Appl. No.: 11/339,484

(22) Filed: Jan. 26, 2006

(65) Prior Publication Data

US 2006/0193634 A1    Aug. 31, 2006

(30) Foreign Application Priority Data

Feb. 28, 2005    (EP)    ................................. 05004344

(51) Int. Cl.
*H04B 10/00* (2006.01)
*H04B 10/10* (2006.01)

(52) U.S. Cl. ........................ 398/118; 398/119; 398/120; 398/127; 398/130; 398/208; 398/210

(58) Field of Classification Search ......... 398/118–131, 398/202, 208–213
See application file for complete search history.

(56) References Cited

U.S. PATENT DOCUMENTS 4,253,048 A * 2/1981 Osako ........................ 378/110
7,140,752 B2 * 11/2006 Ashdown .................... 362/276
7,394,210 B2 * 7/2008 Ashdown .................... 315/291
2002/0167701 A1 * 11/2002 Hirata ......................... 359/172
2003/0002119 A1   1/2003 Aretz et al.
2004/0251464 A1   12/2004 Lee
2005/0002673 A1 * 1/2005 Okano et al. ................ 398/130
2005/0005225 A1 * 1/2005 Johnson et al. .............. 714/758
2006/0239689 A1 * 10/2006 Ashdown .................... 398/130

FOREIGN PATENT DOCUMENTS

JP    01-122220    *    5/1989

* cited by examiner

*Primary Examiner*—Ken N Vanderpuye
*Assistant Examiner*—Li Liu
(74) *Attorney, Agent, or Firm*—Oblon, Spivak, McClelland, Maier & Neustadt, P.C.

(57) ABSTRACT

The invention relates to a wireless optical data transmission system and a method for wireless optical transmission of data. The system comprises a data stream generator for generating at least two parallel data streams (18.1, 18.2, 18.3). The parallel data streams are transmitted by a number of separate optical transmitting devices (8, 9, 10) separately by emitting first optical signals. The system further comprises a corresponding number of detectors (19, 20, 21) for detecting the first optical signals and converting them into respective second signals (26.1, 26.2, 26.3) and an error correction unit (31) for correcting the amended second signals. Within a predistortion (29) unit each second signal (26.1, 26.2, 26.3) is amended individually with respect to a transmission channel used.

10 Claims, 3 Drawing Sheets

METHOD FOR WIRELESS OPTICAL TRANSMISSION OF DATA AND WIRELESS OPTICAL DATA TRANSMISSION SYSTEM

FIELD OF INVENTION

The invention relates to a method for wireless optical transmission of data and to a wireless optical data transmission system.

BACKGROUND

There are several types of wireless optical data transmission systems. One possibility for realising such a wireless system for transmitting data is using white light emitting devices that are pulsed at a high frequency, which could not be detected by the human eye. Modulation scheme of on/off keying (OOK) for modulation is adopted. It is possible to use different colours of light emitted by a multi-chip-type white LED as parallel transmission channels.

The white light of multi-chip-type white LEDs is produced by simultaneously emitting light in the three basic colours, blue, red and green. The superposition thereof results in white light. The problem with using multi-chip-type white LEDs for transmitting data in parallel is that the power ratio of each light emitting device has to be different in order to obtain white light. When a multi-chip-type white LED is used for illumination it is not acceptable to emit bluish or reddish light for example. Thus, the power ratio of the emitted light of the three colour LEDs is fixed and cannot be adjusted.

The emitted light of the three LEDs is detected by three separate detectors, but the conversion efficiency of each of the detectors depends on the colour of each of the emitting LEDs. Therefore, the reliability of the output signal of the detectors is different for each colour.

For assuring an error rate which is less than 1E-10 e.g. for wireless communications, an error control decoder is required. It is known that the performance of soft decision error control decoders is usually better than the performance of hard decision error control decoders. But even the use of a soft decision error control decoder might not achieve the required error rate, because of the different reliability on each colour.

It is therefore an object of the present invention to create a method for wireless optical transmission of data and a wireless optical transmission system to improve the performance of soft decision error control decoding.

This problem is solved by a method according to claim 1 and a data transmitting system according to claim 10.

SUMMARY OF THE INVENTION

According to the method of claim 1 and the transmission system of claim 10 at least two parallel data streams are produced. Each of these parallel data streams is wirelessly transmitted by use of separate optical transmitting devices. The optical transmitting devices emit first optical signals in order to transmit the data. Each emitted first optical signal is detected by a corresponding detector which converts the received first optical signal. Thus, if three parallel data streams are used e.g. three second signals are output by three separate detectors. Before these signals are fed to an error correction decoder, each of the second signals is amended individually. The amendment of the second signals is performed by a predistortion unit.

The error decoding performed on the basis of the amended second signals is much better than performing the error correction on the basis of the output signal of the detectors. By amending the second signals it is possible to consider the poor reliability of the output second signals of a particular detector. On the other hand, a signal with a good reliability obtained from a detector for another light colour is amended with respect to the known good reliability. As a result, the error decoding algorithm of the soft decision error control decoder works in a better way and the overall performance of such a transmission system is improved. Further improvements of the invention are claimed in the subclaims.

A preferred embodiment of the present invention is shown in the drawings and will be described in detail below. It is shown:

DETAILED DESCRIPTION OF THE INVENTION

Figure 1:
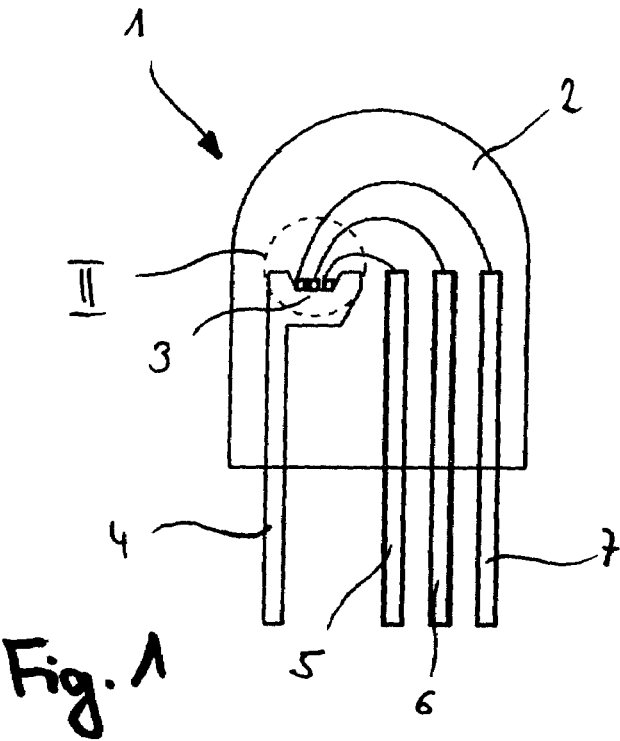
FIG. 1 a diagram of a multi-chip-type white LED

FIG. 1 shows a white LED 1 of the multi-chip-type. The white LED 1 has a moulded cover 2 that is transparent and encloses a support part 3. Preferably, the support part 3 is formed by an electric connector 4 that is connected to ground.

Figure 2:
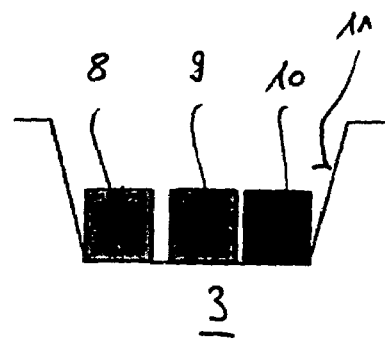
FIG. 2 an enlarged view of part II of FIG. 1

On the surface of the support part 3 three separate LEDs are fixed which is described in greater detail with respect to FIG. 2.

Each of the separate LEDs is fixed on the support part 3 and is electrically connected with conductive paths 5, 6 and 7, respectively. The conductive paths 5, 6, 7 are connected with a source for supplying a supply voltage to each LED.

A multi-chip-type white LED 1 consists of three separate LEDs. Each of these LEDs emits light with a different colour. For emitting white light the colours are green, blue and red. An enlarged view of part II of FIG. 1 is shown in FIG. 2. On top of the support part 3 three light emitting devices 8, 9 and 10 are arranged on the ground of a recess 11. Each of the LEDs is supplied with a voltage individually. Thus, the LEDs 8, 9, 10 can be switched on an off individually.

By controlling the supply voltage of the LEDs 8, 9 and 10 individually, the three LEDs 8-10 can be used for parallel transmission of data so that a red transmission channel, a green transmission channel and a blue transmission channel are established. The rate at which each supply voltage of the LEDs 8-10 is switched on an off is too fast to be detected by the human eye. The human eye therefore only gets the impression of white light being emitted by the white LED 1.

Figure 3:
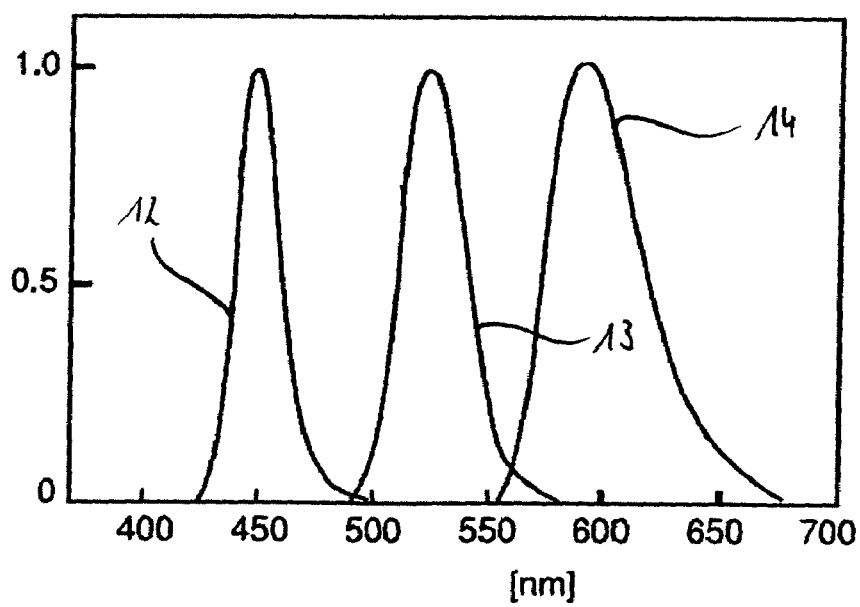
FIG. 3 the spectra of emitted light of a multi-chip-type white LED

In order to get the impression of white light emitted by the white LED 1 the ratio of the optical emitted power from the red, the green and the blue LEDs 8, 9, 10 differs. A spectrum of a blue LED, a spectrum of a green LED and a spectrum of a red LED is shown in FIG. 3 and indicated with reference numerals 12, 13 and 14. It is clear from the shape of the different curves of the blue, the green and the red LED that the emitted power of the three LEDs must not be equal in order to obtain white light.

Figure 4:
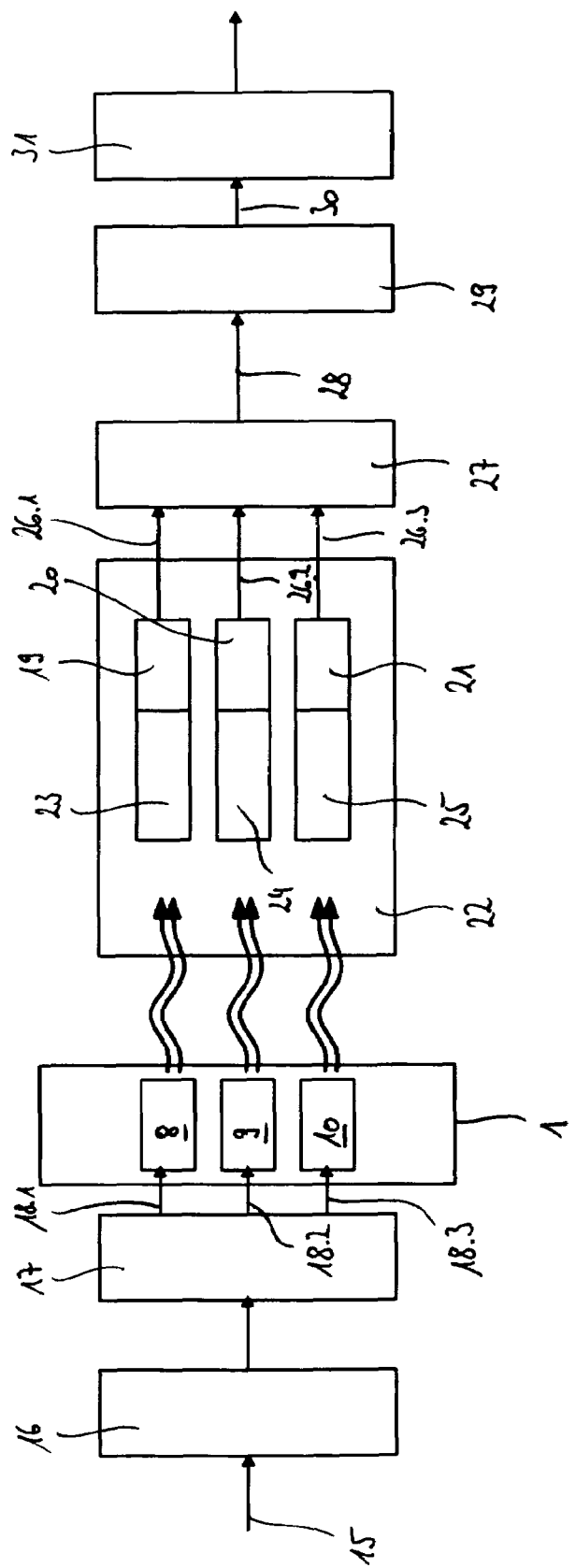
FIG. 4 a block diagram of a optical data transmission system according to the invention and FIG. 5 a flow chart of the method for optical transmission of data according to the invention.

The preferred embodiment of the present invention is now explained referring to the block diagram of FIG. 4. Data 15 to be optically transmitted is processed by a data stream generator and is first input into an encoder 16 that encodes the data with respect to a particular protocol chosen for transmission. The encoded data is output from the encoder 16 as serial data and is transferred to a serial to parallel converter 17. In the preferred embodiment the encoder 16 and the serial to parallel converter 17 form the data stream generator but other sources for parallel data streams are possible. The serial to parallel converter 17 splits the serial encoded data into three parallel data streams 18.1, 18.2 and 18.3. According to the data content of the individual data streams 18.1 to 18.3 the three light emitting devices 8, 9 and 10 are supplied with voltage.

According to the voltage supplied the LEDs 8, 9 and 10 are switched on and off and emit light. Each LED 8 to 10 forms an optical transmitter for a transmission channel. The red, green and blue transmission channels are used in parallel. As described earlier, the ratio of the emitted power of the different LEDs 8, 9 and 10 must not be equal in order to result in white light emitted from the white LED 1.

In order to retrieve the original data 15 to be transmitted three detectors 19, 20 and 21 are arranged within a detector unit 22. Each detector 19, 20 and 21 is connected with a filter for filtering the incident white light with respect to the basic colbürs. The filtered light thus assigns each detector 19, 20, 21 to a particular transmission channel. For example, ahead of detector 19, a bandpass optical filter 23 is arranged that transmits only the red component of the light emitted by the white LED 1. In the same way a second filter 24 is arranged ahead of detector 20, which is a bandpass optical filter too and transmits only the green component of the incident light. In the same way a third filter 25 is arranged ahead of the detector 21, which permits only the blue component of the light to reach the sensitive surface of the detector 21. LED 8 together with filter 23 and detector 19 build a red transmission channel, whereas LED 9 together with filter 24 and detector 20 build a green transmission channel and LED 10 together with filter 25 and detector 21 build a blue transmission channel.

The conversion efficiency of the detectors 19, 20 and 21 is depending on the colour of the incident light. The conversion efficiencies of the three detectors 19, 20, 21 are therefore different in the transmission channels. The detectors 19, 20 and 21 convert the light falling on a sensitive surface into a second signal each. Thus, the detectors 19, 20 and 21 output three second signals 26.1, 26.2 and 26.3, whereby the reliability of the second signals 26.1 to 26.3 differ from each other. This means the second signal that corresponds to the data stream 18.1 which is transmitted by emitting red light by the LED 8 has a different reliability compared with e.g. the second signal being output by detector 21 which corresponds to the data stream 18.3 transmitted by emitting blue light by diode 10. The three parallel second signals 26.1 to 26.3 are input into a parallel to serial converter 27. The parallel to serial converter 27 converts the input parallel second signals 26.1 to 26.3 into a serial signal, which is a common second signal 28.

The common second signal 28 is transferred to a predistortion unit 29. The common second signal r(t) (reference numeral 28) contains the individual second signals 26.1 to 26.3 but being arranged in series. Within the predistortion unit 29 the second signals 26.1 to 26.3 of a common second signal 28 are amended individually. This means that the second signal 26.1 is amended in a different way compared to the second signal 26.3 e.g. The amendment is performed by considering the different optical power of the corresponding transmission channel and the different conversion efficiency of corresponding detectors 19, 20, 21. For amending the second signals individually first a channel factor $P_i$ for each channel i is calculated that considers the emitted optical power of the respective LED 8, 9, 10 and the corresponding conversion efficiency of the respective detector 19 to 21. The part of the common second signal 28 corresponding to a particular second signal 26.1, 26.2, 26.3 is then multiplied by a factor that considers a ratio of the individual channel factor $P_i$ of the respective red, green or blue transmission channel to an overall channel factor.

This amendment is described by the equation $$r'(t) = r(t) \times \frac{\sqrt{3} P_i}{\sqrt{P_r^2 + P_g^2 + P_b^2}}, \text{ with } i = r(ed), g(reen), b(lue).$$

The channels factors $P_i$ are defined by the ratio of the optical output power $M_i$ multiplied by the square root of the conversion efficiency $C_i$ of the respective detector 19 to 21 ($P_i = M_i * \sqrt{C_i}$). Using these functions for amending the second signals results in having more weight on the second signals 26.1, 26.2 or 26.3 with a good reliability and therefore having an improved input signal for the error decoder that leads to a better error rate.

The predistortion unit 29 outputs an amended common second signal r'(t) (reference numeral 30) consisting of parts that represent amended second signals. The amended common second signal 30 is transferred to a soft decision error control decoder 31. The soft decision error control decoder 31 might be a Viterbi decoder or a Viterbi decoder concatenated with Reed-Solomon decoder or a decoder for Turbo Convolutional Code or a decoder for Turbo Product Code or a decoder for Low Density Parity Check Code for example. The performance of such soft decision decoders is enhanced because of the different weighing of the second signals 26.1, 26.2 and 26.3 by amending them, the amendment being performed with respect to the reliability of the signals. On the first hand, the reliability of the signals depends on the optical power emitted by the LED 8 to 10 of the respective transmission channel and on the other hand the reliability depends on the conversion efficiency of the detectors 19 to 21 of the respective transmission channel.

The preferred embodiment which is described and shown in FIG. 4 considers both the different optical power within the transmission channels and the respective conversion efficiency of the detectors 19-21 of the transmission channels which differs due to the colour of the emitting LED 8 to 10. It is also possible to consider only the different optical power or only the different conversion efficiency of the detectors 19 to 21.

Figure 5:
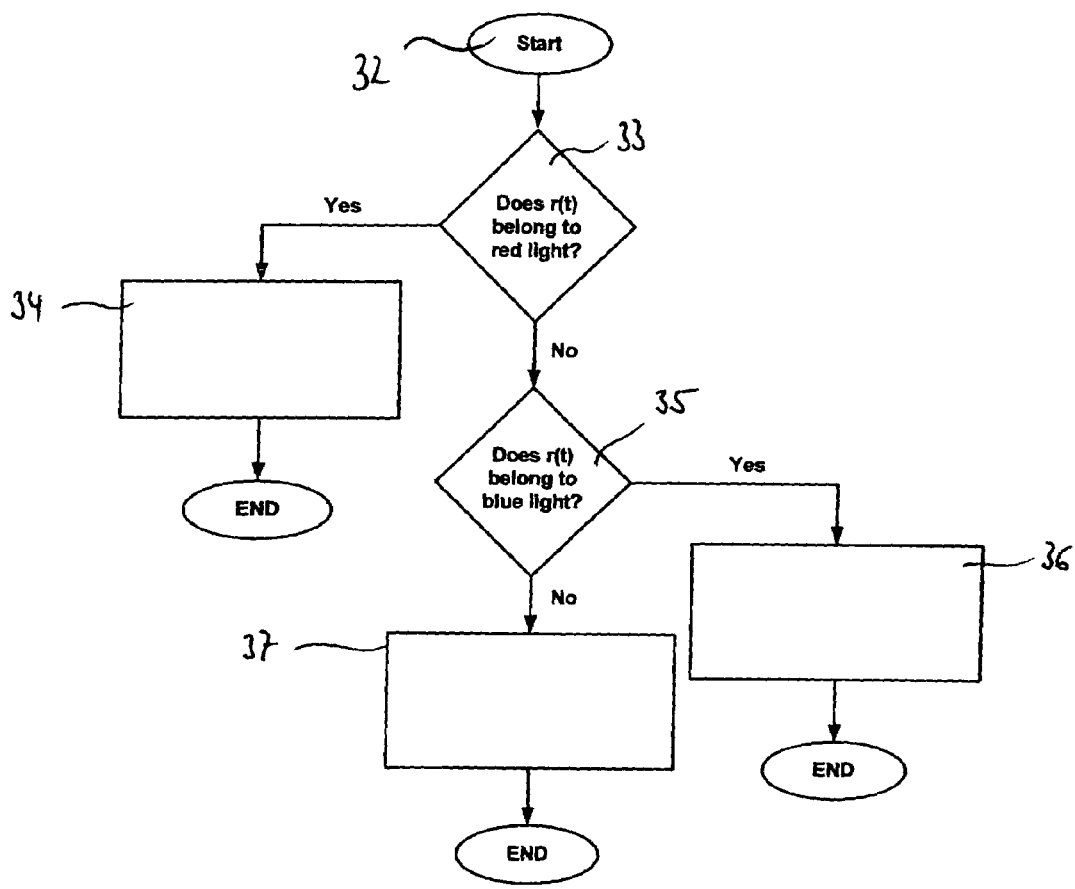

In FIG. 5 a flow chart of the amendment being performed on the common second signal r(t) is shown. In a first step 32 the method is initiated e.g. automatically by inputting a common second signal r(t). In the next step 33 it is questioned whether the actual part of the common second signal r(t) belongs to a second signal 26.1 that corresponds to the red transmission channel. If the answer to this question is "yes" then the actual common second signal r(t) is amended by multiplying the common second signal r(t) with a correction term as explained above. If the answer to the question of step 33 is "no" then the next question is, if the actual common signal r(t) is corresponding to a data stream that is transmitted via the blue transmission channel. If the question of step 35 is answered "yes" then the common second signal r(t) is amended by being multiplied with another correction factor considering the channel factor $P_b$ of the blue transmission channel. If the question of step 35 has to be answered "no" then the actual signal must correspond to the data stream 18.2, which is transmitted by the green transmission channel. In this case, the actual common second signal r(t) is amended by a correction factor that considers the channel factor $P_g$ of the green transmission channel. Every time the common second signal 28 is amended, the processing of data ends and the amended signal is transferred to the soft decision error control decoder 31.

The scope of the invention is not limited by the shown preferred embodiments but covers also arbitrary combinations of the shown features.

The invention claimed is:

1. A method for wireless optical transmission of data comprising:
    producing at least two parallel data streams;
    wirelessly transmitting each data stream by a separate optical transmitting device, the transmitting devices each emitting a first optical signal;
    detecting the first optical signals by a corresponding number of separate detectors;
    converting each first signal into a respective second signal;
    amending each second signal individually by a predistortion unit with respect to a transmission channel used; and
    performing an error correction on the amended second signals;
    wherein the separate detectors produce parallel second signals and the parallel second signals are converted to a common second signal comprising the second signals before amending the second signals, and
    wherein the second signals are amended with respect to both a respective different predefined power ratio of the emitted signals and a respective differing conversion efficiency.

2. The method according to claim 1, wherein the first optical signals are emitted with the predefined power ratio.

3. The method according to claim 2, wherein three parallel data streams are produced and transmitted by a green, a red and a blue LED emitting a first optical signal each, the first optical signals having the predefined emitting optical power ratio for emitting white light in sum.

4. The method according to claim 1, wherein the first optical signals are converted to second signals with the differing conversion efficiency.

5. The method according to claim 1, wherein the error correction is performed by a soft decision decoder.

6. A wireless optical data transmission system comprising:
    a data stream generator for generating at least two parallel data streams;
    a number of separate optical transmitting devices for wirelessly transmitting the parallel data streams separately by emitting first optical signals;
    a corresponding number of detectors for detecting the first optical signals and converting them into respective second signals; and
    an error correction unit for correcting the amended second signals,
    wherein the system further comprises a predistortion unit for amending each second signal individually with respect to a transmission channel used;
    wherein the corresponding detectors produce parallel second signals and a parallel to serial converter converts the parallel second signals into a common second signal comprising the second signals before amending the second signals, and
    wherein the predistortion unit amends the second signals with respect to both the respective different predefined power ratio of the emitted signals and the respective differing conversion efficiency.

7. A wireless data transmission system according to claim 6, wherein the separate optical transmitting devices are adapted to emit the first optical signals with the predefined power ratio.

8. A wireless data transmission system according to claim 7, wherein the system comprises the optical transmitting devices being a green LED, a red LED and a blue LED, the green, the red and the blue LED being adapted to emit light with the predefined optical power ratio for emitting white light.

9. A wireless data transmission system according to claim 6, wherein the conversion efficiency of the different detectors is different.

10. A wireless data transmission system according to claim 6, wherein the system further comprises a soft decision decoder.

* * * * *